United States Patent
Samuelraj et al.

(10) Patent No.: US 8,312,215 B2
(45) Date of Patent: Nov. 13, 2012

(54) METHOD AND SYSTEM FOR RESOLVING CONFIGURATION CONFLICTS IN RAID SYSTEMS

(75) Inventors: Daniel Gnanaraj Samuelraj, Lawrenceville, GA (US); Jianning Wang, Kennesaw, GA (US); Jinwen Xie, Sugar Hill, GA (US)

(73) Assignee: LSI Corporation, Milpitas, CA (US)

( * ) Notice: Subject to any disclaimer, the term of this patent is extended or adjusted under 35 U.S.C. 154(b) by 610 days.

(21) Appl. No.: 12/212,680

(22) Filed: Sep. 18, 2008

(65) Prior Publication Data
US 2010/0070705 A1 Mar. 18, 2010

(51) Int. Cl.
*G06F 12/00* (2006.01)
*G06F 12/06* (2006.01)

(52) U.S. Cl. .............. 711/114; 711/210; 711/E12.001; 711/E12.084

(58) Field of Classification Search .............. 711/114, 711/210, E12.001, E12.084
See application file for complete search history.

(56) References Cited

U.S. PATENT DOCUMENTS
2004/0073747 A1* 4/2004 Lu .......................... 711/114
* cited by examiner

*Primary Examiner* — Mardochee Chery (57) ABSTRACT

A software-based RAID system is provided that enables configuration conflicts to be detected and resolved between a PD that is logically present but physically missing, and a PD that is physically and logically present. In accordance with the invention, a determination is made as to whether such a configuration conflict exists, and if so, the logically-present, but physically missing, reference identifier associated with the PD is remapped to a port number that currently is not in use.

16 Claims, 4 Drawing Sheets

METHOD AND SYSTEM FOR RESOLVING CONFIGURATION CONFLICTS IN RAID SYSTEMS

TECHNICAL FIELD OF THE INVENTION

The invention relates generally to data storage systems and, more particularly, to a method and system for resolving configuration conflicts in a Redundant Array of Inexpensive Disks (RAID) system.

BACKGROUND OF THE INVENTION

A storage array is a data storage system that includes multiple disk drives or similar persistent storage units. A storage array allows large amounts of data to be stored in an efficient manner. A storage array also provides redundancy to promote reliability, as in the case of a Redundant Array of Inexpensive Disks (RAID) system. The phrase "RAID" is generally used to describe computer data storage schemes that divide and replicate data among multiple physical hard disk drives (PDs). In general, RAID systems simultaneously use two or more PDs to achieve greater levels of performance, reliability and/or larger data volume sizes. One or more PDs are setup as a RAID virtual disk drive (VD). In the VD, data is typically distributed across multiple PDs, but the VD is seen by the user and by the operating system of the host computer system (e.g., a server) as a single disk. Storage space in the VD maps to the physical storage space in the PDs, but the VD usually does not itself represent a single physical storage device. Typically, a meta-data mapping table is used to translate an incoming VD identifier and address location into a PD identifier and address location, respectively.

A variety of different RAID system designs and RAID levels exist, all having two key design goals, namely: (1) to increase data reliability and (2) to increase input/output (I/O) performance. In RAID systems, I/O functions of the host computer system are expedited due to the fact that multiple PDs are capable of being accessed simultaneously. RAID systems improve data storage reliability and fault tolerance compared to single-drive computer systems because data lost as a result of a PD failure can be recovered by using the remaining data and parity stored in one or more other PDs to reconstruct the data that was stored on the failed PD.

RAID systems may be implemented in hardware or software. Software-based RAID systems utilize RAID software that provides an abstraction layer between the PDs and the VD. The RAID software is typically part of the operating system (OS) of the host computer system. The RAID software runs on the host CPU and the RAID data is carried on busses between the host PD controller and the host CPU. The host CPU has processing overhead associated with executing the RAID software, which can degrade performance of the host computer system. In addition, the RAID data carried on the busses between the host PD controller and the host CPU can create congestion, which can also degrade performance. However, in many cases, software-based RAID systems are suitable solutions, particularly in cases where lower RAID levels are being implemented.

Hardware-based RAID systems use a dedicated hardware RAID controller to perform many of the I/O tasks associated with the storage and retrieval of data in and from the RAID VD, respectively. The dedicated RAID hardware controller reduces the amount of RAID processing that needs to be performed by the host CPU and therefore improves performance by freeing up the host CPU to perform other tasks. In addition, because many of the I/O tasks are performed in the RAID hardware controller instead of in the host CPU, there is a reduction in the amount of RAID data that is carried on the busses between the host CPU and host PD controller, which also improves performance.

The major advantage of software-based RAID systems over hardware-based RAID systems is that software-based RAID systems only require a standard PD controller. Consequently, software-based RAID systems are typically much less expensive to implement than hardware-based RAID systems. Therefore, in many cases, software-based RAID systems that allow a suitable level of performance to be achieved are desirable alternatives to hardware-based RAID systems. However, configuration conflicts can occur in software-based RAID systems, resulting in system errors. In particular, a configuration conflict can occur in a software-based RAID system when a PD is reallocated to a different port number in the event of a loss of power to the PD during bootup.

Figure 1A:
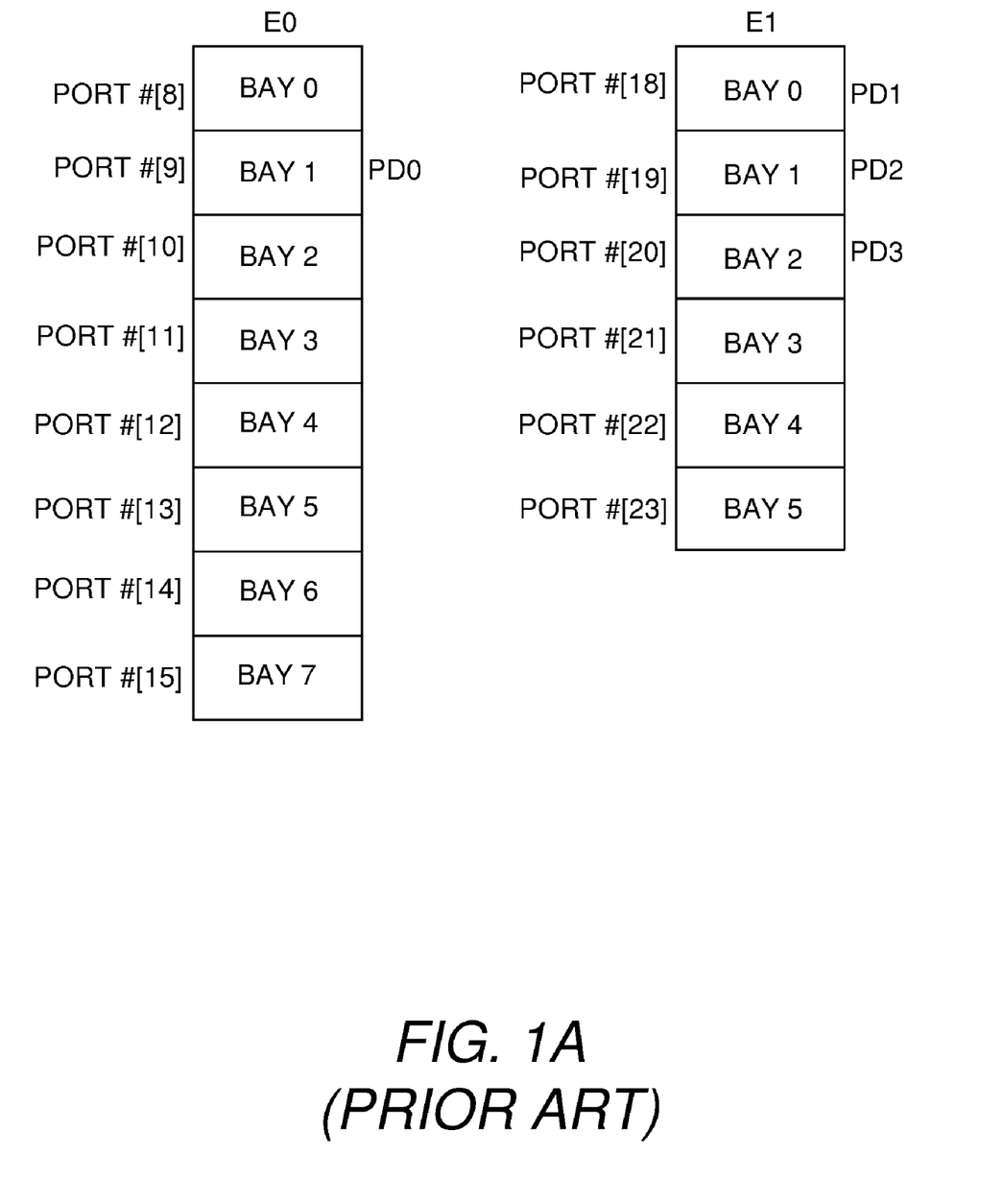
FIGS. 1A and 1B illustrate block diagrams of two expanders, E0 and E1, for holding PDs in a software-based RAID system.

FIGS. 1A and 2B illustrate block diagrams of two expanders, E0 and E1, for holding PDs in a software-based RAID system. For ease of illustration, the other components of the software-based RAID system are not shown in FIGS. 1A and 1B. The expanders E0 and E1 are enclosures having a plurality of bays formed therein for holding the PDs. In the example shown in FIGS. 1A and 1B, expander E0 has eight bays (Bay 0-Bay 7) and expander E1 has six bays (Bay 0-Bay 5). An I/O interface device (not shown) of the RAID system accesses the PDs held in the bays of the expanders E0 and E1 in order to read data from and write data to the PDs. The RAID system includes tables that provide a logical mapping of the port numbers of the I/O interface device to the bay numbers of the expanders E0 and E1. Thus, the PDs are electrically connected to respective bays, which, in turn, are electrically connected to respective ports of the I/O interface device. Consequently, the mapping of the port numbers of the I/O interface device to the bay numbers of the expanders provides a mapping of the respective port numbers of the I/O interface device to the respective identifiers of the respective PDs held in the bays of the expanders E0 and E1. The manner in which this configuration can lead to the occurrence of a configuration conflict will now be described with reference to FIGS. 1A and 1B.

For this example, it will be assumed that expanders E0 and E1 are assigned port numbers [8-15] and [18-23], respectively It will also be assumed for this example that the user configures the RAID system to have two RAID level 1 (R1) VDs, namely, VD0 and VD1. It will also be assumed that the system is configured such that VD0 comprises PDs 0 and 1 located at port numbers 9 and 18, respectively, and that VD1 comprises PDs 2 and 3 located at port numbers 19 and 20, respectively. This configuration is shown in FIG. 1A. Each of the PDs 0, 1, 2, and 3 includes a disk data format (DDF) file that stores configuration information about the PD, including the bay number in which the PD is held. From the DDFs of the PDs 0 and 1, VD0 is capable of ascertaining that PDs 0 and 1 are contained in bays 1 and 0 of expanders E0 and El, respectively, and that PDs 0 and 1 are mapped to port numbers 9 and 18, respectively. Likewise, from the DDFs of the PDs 2 and 3, VD1 is capable of ascertaining that PDs 2 and 3 are contained in bays 2 and 3 of expander E1 and that PDs 2 and 3 are mapped to port numbers 19 and 20, respectively.

Figure 1B:
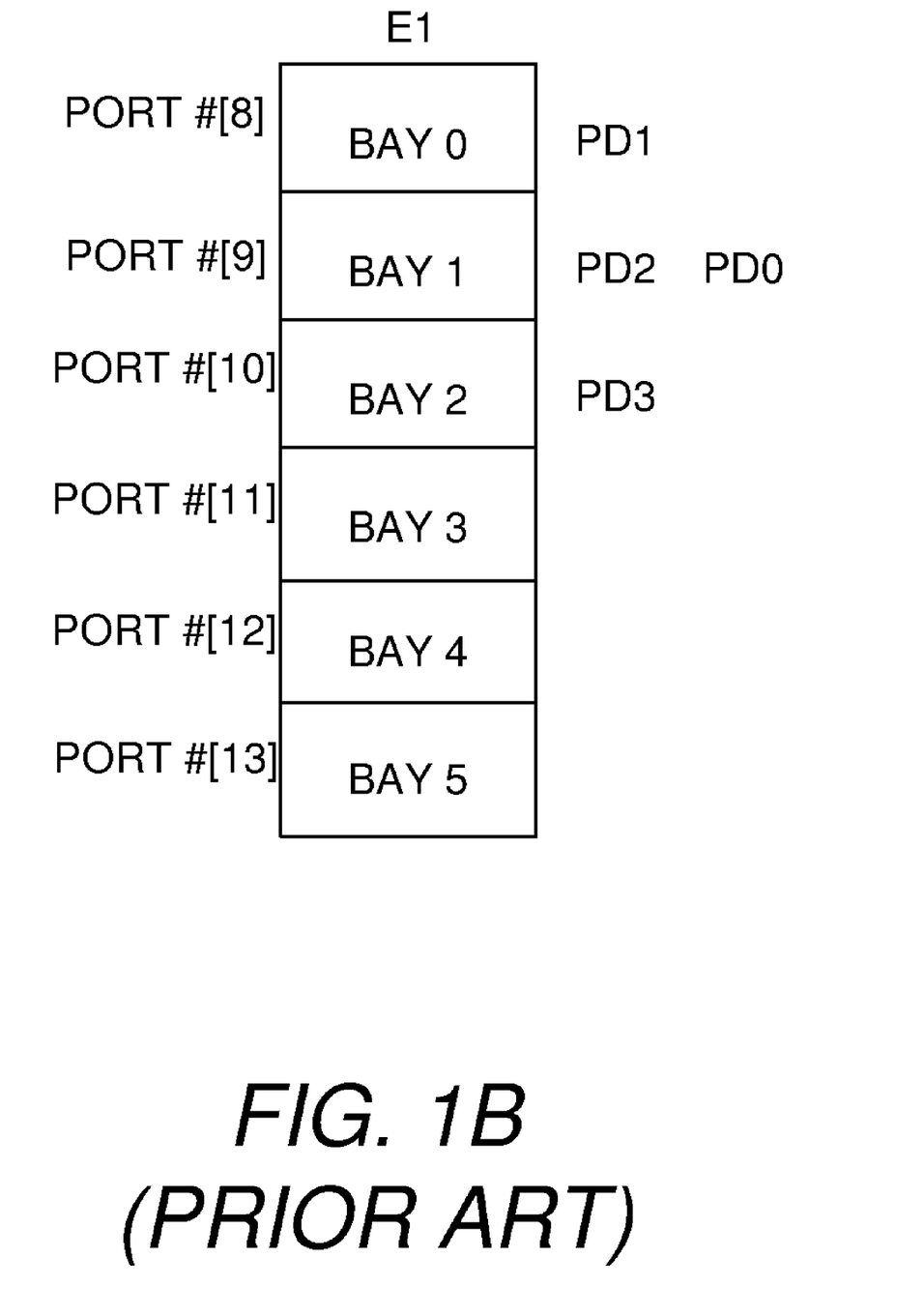

The configuration of VD0 across multiple expanders can result in configuration conflicts. If, for example, the power cable providing power to expander E0 becomes disconnected or fails during boot up, then E1 will be the only expander operating. In this scenario, the I/O interface device normally performs a remapping of the port numbers that are assigned to expander E1 as follows: port numbers 18, 19 and 20 that were originally mapped to bays 0, 1 and 2, respectively, of expander E1 will be reassigned to port numbers 8, 9 and 10, respectively. However, the DDF of the missing PD, namely PD0, has not yet been updated and still indicates that PD0 is in bay 9. Therefore, VD0 understands from the DDF of PD 0 that port number 9 is assigned to PD0. The missing PD is referred to herein as a logical PD because its VD believes the PD is present even though the PD is physically missing. The DDF of the physically and logically present PDs that have been relocated have been updated to indicate the bay numbers and port numbers to which they have been remapped. Therefore, VD1 knows from the DDF of PD 2 that PD 2 has been remapped to bay number 1 and port number 9. Consequently, VD0 and VD1 are both claiming ownership of port number 9, which results in a configuration conflict. For the software-based RAID system to operate properly, the configuration conflict must be resolved.

Currently, no satisfactory solution exists for resolving such configuration conflicts in software-based RAID systems. When a software-based RAID system is booted up, the host server central processing unit (CPU) executes Basic Input/Output System (BIOS) Power-On Self Test (POST) code stored in an Option Read Only Memory (ROM) device of the I/O interface device. When the CPU executes this code, it performs checks to determine whether more than one logical PD has a DDF that indicates that it is connected to the same port. If the CPU determines that the DDFs of two logical PDs indicate that they are connected to the same port, the CPU causes a message to be displayed to the user on the display device of the RAID system that advises the user that: BIOS has detected configured disks with some drive(s) missing; the user needs to power down the system and disconnect one of the PDs located at the specific port number; if the user fails to do so, the configuration will be lost.

If the user ignores the warning message and proceeds, the VD configuration will be lost. If the user heeds the warning message and disconnects the PD, the CPU will remove the corresponding logical PD from the VD, thereby resolving the configuration conflict. However, this results in a reduction in the storage capacity of the software-based RAID system. A need exists for a software-based RAID system in which configuration conflicts can be satisfactorily resolved and a method for satisfactorily resolving configuration conflicts in a software-based RAID system.

SUMMARY OF THE INVENTION

The invention provides a software-based RAID system having the ability to resolve configuration conflicts that occur therein and a method for resolving configuration conflicts in a software-based RAID system. The software-based RAID system comprises an input/output (I/O) interface device having a plurality of ports, each of which has a respective port number, at least one actual physical disk (PD) connected to at least one of the ports of the I/O interface device, a memory device, and a processor. The processor is configured to perform a conflict configuration resolution algorithm that detects an existence of a configuration conflict in the RAID system and resolves a detected configuration conflict. The processor detects the existence of a configuration conflict by determining whether or not a current RAID system configuration indicates that a first logical PD and a second logical PD are mapped to a same port number of the I/O interface device. The first and second logical PDs are logical representations of first and second actual PDs, respectively. If the processor determines that the first and second logical PDs are mapped to the same port number of the I/O interface device, the processor resolves the configuration conflict by remapping one of the first and second logical PDs to a port of the I/O interface device that is not currently connected to an actual PD.

The method comprises detecting if a configuration conflict exists in the RAID system by determining whether or not a first logical PD and a second logical PD are mapped to a same port number of the I/O interface device of the RAID system, and if so, resolving the configuration conflict in the processor by remapping one of the first and second logical PDs to a port of the I/O interface device that is not currently connected to an actual PD.

The invention also provides a computer program stored on a computer-readable medium for detecting and resolving configuration conflicts in a software-based RAID system. The program comprises code for determining whether or not a current RAID system configuration indicates that a first logical PD and a second logical PD are mapped to a same port number of the I/O interface device of the RAID system, and code for resolving a configuration conflict by remapping one of the first and second logical PDs to a port of the I/O interface device that is not currently connected to an actual PD.

These and other features and advantages of the invention will become apparent from the following description, drawings and claims.

DETAILED DESCRIPTION OF ILLUSTRATIVE EMBODIMENTS

In accordance with the invention, a software-based RAID system is provided that enables configuration conflicts to be resolved between a PD that is logically present but physically missing, and a PD that is physically and logically present. In accordance with the invention, a determination is made as to whether such a configuration conflict exists, and if so, the logically-present, but physically missing, reference identifier associated with the PD is remapped to a port number that currently is not in use.

Figure 2:
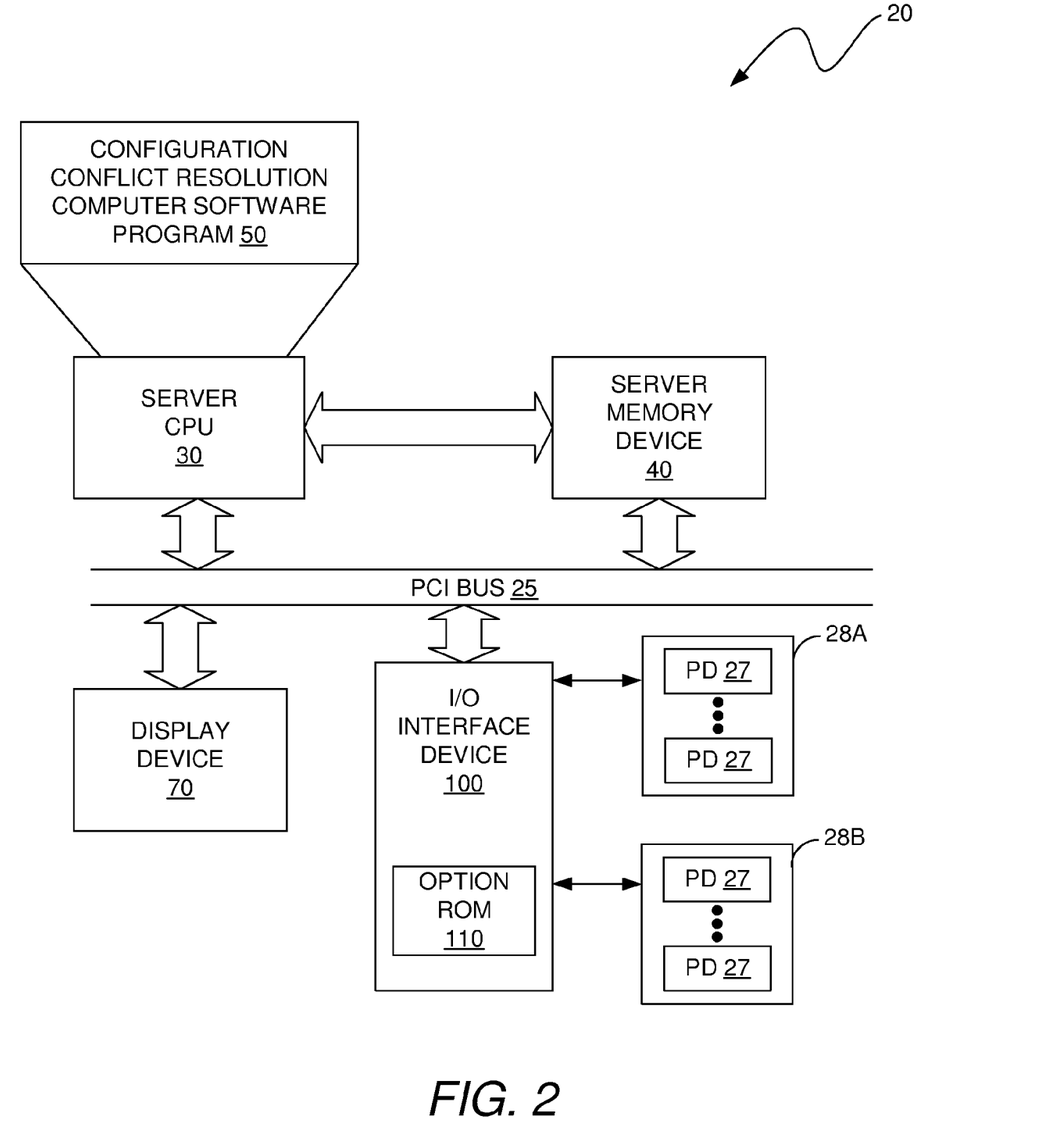
FIG. 2 illustrates a block diagram of a software-based RAID system in accordance with an embodiment of the invention.

FIG. 2 illustrates a block diagram of the software-based RAID system 20. The system 20 includes a host server central processing unit (CPU) 30, a host server memory device 40, a host peripheral interconnect (PCI) bus 25, an I/O interface device 100, and multiple PDs 27. The host server memory device 40 stores software programs for execution by the server CPU 30 and data. Because the RAID system 20 is software-based, the I/O algorithms that generate I/O commands for writing and reading the PDs 27 and the mathematically intensive RAID algorithms are preferably performed by the host server CPU 30. The I/O interface device 100, which may be an adapter, receives the I/O commands generated by the host server CPU 30 and performs I/O tasks associated with these commands to write and read the PDs 27 and to perform redundancy, e.g., writing and reading of parity bits. The I/O interface device 100 includes an Option ROM device 110 that stores BIOS POST code. The Option ROM device 110 typically also stores runtime code and data.

The I/O interface device 100 is typically configured to perform data transfer in compliance with one or more known data transfer protocol standards, such as the Serial Attached SCSI (SAS) and/or the Serial Advanced Technology Attachment (SATA) standards. The I/O interface device 100 is physically connected by cables (not shown) to the PDs 27. The PDs 27 are typically held in bays of one or more expanders 28. In order to demonstrate the manner in which the invention is capable of resolving configuration conflicts, it will be assumed that the system 20 includes at least two expanders 28A and 28B and that at least two VDs, namely, VD0 and VD1, have been setup in the host server CPU 30. It will also be assumed that VD0 is configured across expanders 28A (E0) and 28B (E1) in order to present a scenario in which a configuration conflict may arise. However, as described below in more detail, it is not necessary for the system 20 to include expanders or for one of the VDs to be configured across multiple expanders. Also, the invention is not limited with respect to the number of VDs that are setup in the system 20.

In accordance with the invention, the host server CPU 30 executes a conflict resolution computer software program 50 that detects whether a configuration conflict exists, and if so, resolves the configuration conflict. Preferably, the computer code comprising the program 50 is part of the BIOS POST code stored in the Option ROM device 110. The term "BIOS POST" is used herein interchangeably with the term "Option ROM POST". The I/O interface device 100 may be a component that is placed on the server motherboard (not shown) during the original manufacturing and assembly of the server motherboard and its components. In such cases, the Option ROM device 110 is typically some storage area in some memory device that is placed on the server motherboard at the time of manufacturing and assembly of the motherboard, such as memory locations in host server memory device 40. Alternatively, the I/O interface device 100 may be an add-in component that is added to the server motherboard at some later time. For example, the add-in component may be a Peripheral Component Interconnect (PCI) device (e.g., PCI-X, PCI-E, etc.) that plugs into a PCI slot on the server motherboard. In cases in which the I/O interface device 100 is an add-in component, the Option ROM device 110 is a memory device that is part of the add-in I/O interface device 100.

The program 50 determines whether a configuration conflict exists as follows. Each of the PDs 27 has a unique PD_Reference associated with it that uniquely identifies the PD. The host server CPU 30 executes the Option ROM POST code comprising program 50, which is stored in the Option ROM device 110. During this process, the CPU 30 performs actions under the control of the Option ROM POST code. When the CPU 30 executes these instructions, the following actions occur. The CPU 30 sends a command to the port of the I/O interface device 100 to which the PD having the particular PD_Reference is expected to be attached. The actual command that is used for this purpose depends on whether the I/O interface device 100 uses the SATA or the SAS data transfer protocols. If the I/O interface device 100 uses the SATA protocol, the command is typically an IDENTIFY_DEVICE command. If the I/O interface device 100 uses the SAS protocol, the command is typically an INQUIRY command. In either case, the command will be referred to hereinafter generally as the Identify-Device command. The invention is not limited with respect to the type of data transfer protocol that is used by the I/O interface Device 100 or with respect to the particular command that is used for this purpose.

The Identify-Device command obtains basic information about a target PD. Using this basic information, the host CPU 30 uses a known algorithm to compute the aforementioned PD_Reference that uniquely identifies the PD. The algorithm used for computing the PD_Reference is typically a standard cyclic redundancy check (CRC) algorithm that processes the data returned from the queried PD to produce the corresponding PD-Reference.

After the CPU 30 has computed the PD_Reference, the CPU 30 compares the received PD_Reference with the PD_Reference that the CPU 30 expects to be returned. If the PD_References match, then the CPU 30 interprets the match to mean that the queried PD is physically present at the port. If the PD_References do not match, then the CPU 30 interprets the mismatch to mean that the PD is a logical PD (i.e., part of a VD configuration) that is not physically present at the port, which means that a configuration conflict exists. The CPU 30 preferably performs this process for each logical PD of each VD of the system 20.

In the event that a configuration conflict is detected by the CPU 30, the computer code 50 causes the CPU 30 to perform an algorithm that finds a port that is not physically occupied by an actual PD. One way to perform this algorithm is as follows. The CPU 30 sequentially queries the ports starting at port 0 to determine whether an actual PD is physically present at the port. If the CPU 30 determines that an actual PD is physically present at port 0, the CPU 30 increments the port number to 1 and checks port number 1 for a physically present PD. This process of incrementing the port number and checking the corresponding port continues until either (1) the CPU 30 finds a port that is not physically occupied by an actual PD, or (2) the CPU 30 determines that the port number has been incremented to a number that is equal to or greater than the maximum number of ports that are possible in the system 20. This process is described in detail below with reference to FIG. 3.

If the CPU 30 finds a port that is not physically occupied by an actual PD, the CPU 30 then remaps the logical PD to the unoccupied port number. This remapping of the logical PD is then recorded in a memory device (e.g., memory device 40 and/or Option Rom device 110) to update the corresponding configuration of the VD to which the missing actual PD belongs. Preferably, a message is then displayed on a display device 70 that informs the user that the missing PD has been reassigned to the unoccupied port (i.e., to the port having the port number to which the corresponding logical PD has been remapped).

Due to the fact that the configuration conflict may have arisen from an unexpected error in the system 20, the DDF of the remapped PD preferably will not be updated until the user confirms the configuration changes. Preferably, at the end of the Option ROM POST process, a message is displayed to the user on the display device 70 that gives the user the choice of either accepting the new configuration as resolved by the Option ROM POST code 50 or shutting down the system 20 and placing the PDs back in the original slots. If the user confirms the configuration changes, the DDF of the relocated PD will be updated to reflect the new logical and physical configuration of the PD. Alternatively, the DDF of the relocated PD may be updated automatically upon the CPU 30 detecting that the PD has been connected to the new port.

It should be noted that some software-based RAID systems only support a limited number of PDs. In such systems, remapping the logical PD to a new port number may result in the number of PDs in use exceeding the number supported by the system. In such cases, preferably a message is displayed on the display device 70 after the Option ROM POST code 50 runs that informs the user that one or more PDs need to be removed in order to accommodate this system limitation.

It is also possible that the user will notice and attempt to resolve a configuration conflict by using another system to clear the configuration of the DDF of the missing PD. For example, it will be assumed that one of the PDs 27 of expander 28A is part of VD0 and is located at port #9 and that this particular PD becomes missing due to a cable failure. In this scenario, it is possible that the user may use a different system to clear the DDF configuration of the missing actual PD and use the PD at, for example, port 14. In accordance with the invention, if the CPU 30 detects that an actual PD is missing from a port to which it had previously been connected and that an actual unconfigured PD (i.e., a PD that has no DDF data) has been connected to a different port, the server CPU 30, under the control of the Option ROM POST code 50, will cause the PD_Reference of the logical PD associated with the new connection to be incremented by one. Incrementing the PD_Reference of the logical PD by one ensures that the PD_Reference of the logical PD does not match the PD_Reference of the actual PD. Due to the fact that a PD_Reference is the sole mechanism used to identify a PD, ensuring that the PD_References for the actual and logical PDs do not match in this situation eliminates the possibility that the actual PD will be considered to be part of VD0.

Figure 3:
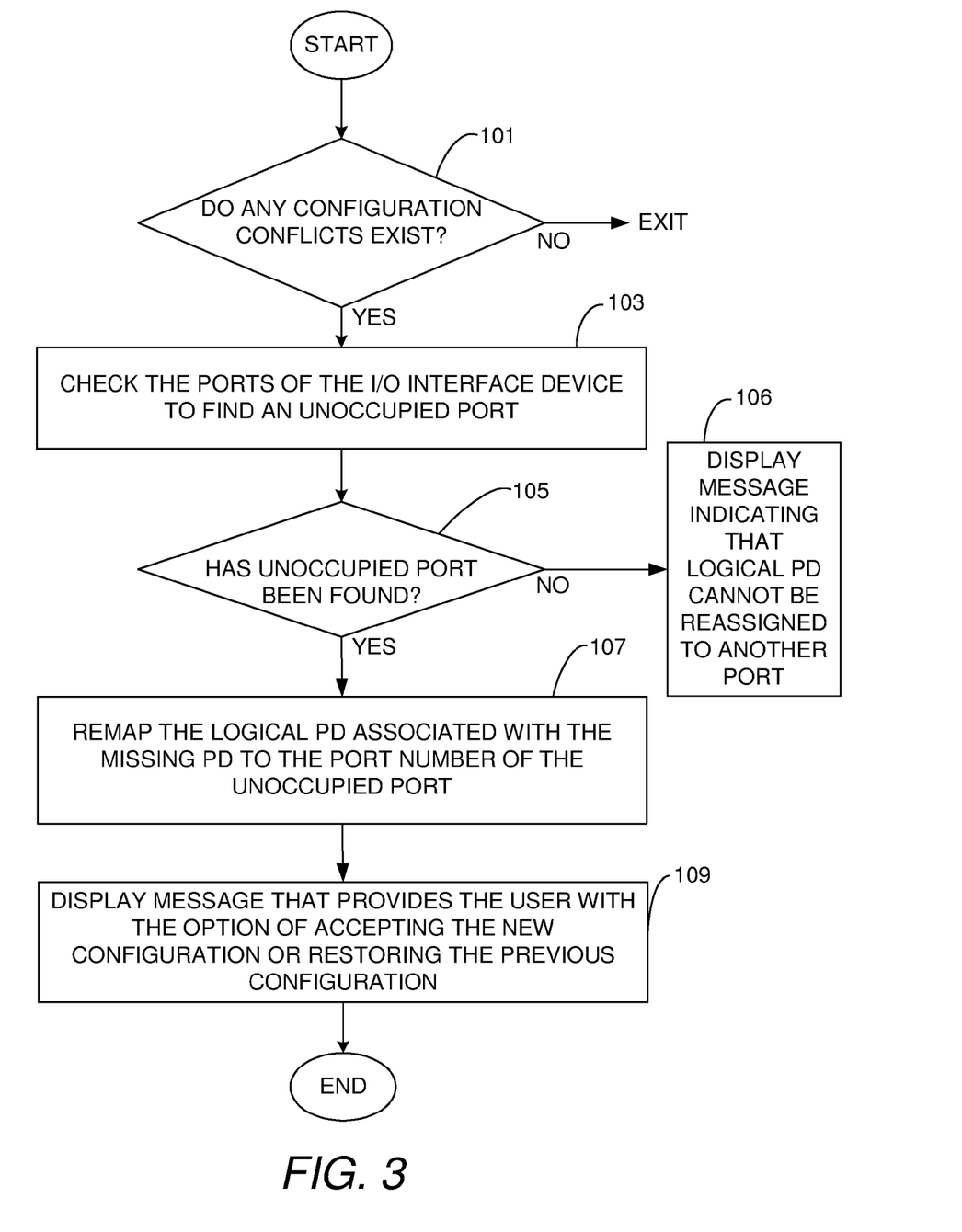
FIG. 3 illustrates a flowchart that represents the method for resolving configuration conflicts in a software-based RAID system in accordance with an embodiment.

FIG. 3 illustrates a flowchart that represents the method of the invention in accordance with an embodiment for detecting if a configuration conflict exists, and if so, resolving the conflict. The method will be described also with reference to FIG. 2 in order to provide a system in which the method may be performed. The program may be manually started by a user, but will typically be automatically invoked when an event occurs. For example, the program may be invoked when the software-based RAID system boots up. Alternatively, the program may be automatically invoked when a condition or event is detected, such as, for example, in the event of a power failure being detected, and/or in the event of a disconnected cable being detected.

After the program starts, a determination is made as to whether any configuration conflicts exist, as indicated by block 101. The determination represented by block 101 is preferably made in the manner described above by sending an Identify-Device command to each of the ports, receiving the data returned from the ports in the CPU or other processing logic, using the returned data in the CPU or other processing logic to compute the corresponding PD_References of the actual PDs, and comparing the PD_References of the actual PDs with the PD_References of the respective logical PDs to determine whether or not they match. If no configuration conflicts are found to exist (i.e., if there are no mismatches of the respective actual and logic PD_References), the program ends or returns to block 101, depending on the desired manner in which the method is implemented. The program could be performed either continuously, periodically, or only upon being either manually or automatically invoked in the aforementioned manner.

If a determination is made at block 101 that a configuration conflict has been detected (i.e., a non-matching PD-Reference), then the process proceeds to block 103. At block 103, the ports of the I/O interface device 100 are checked to find a port that is not currently connected to an actual PD. Block 105 represents the portion of the process that determines whether a checked port is an unoccupied port. There are multiple ways of performing the process of finding a port that is not currently connected to an actual PD. The invention is not limited to any particular manner of performing this process. Preferably, the portions of the process represented by blocks 103 and 105 are performed sequentially starting with the lowest possible port number to which an actual PD could be connected, checking the port identified by the port number to determine whether it is connected to an actual PD, if a determination is made that the port being checked is connected to an actual PD, then incrementing the port number to a new port number and checking the port identified by the new port number. If a determination is made that the port identified by the new port number is connected to an actual PD, then the port number is again incremented to a new port number and the port identified by the new port number is checked to determine whether or not it is connected to an actual PD. This process continues until either a port is found that is not connected to an actual PD or until the port number value has been incremented to a value that is equal to or greater than the maximum possible port number.

Prior to performing the process represented by blocks 103 and 105, the maximum possible port number value is determined. If the I/O input device 100 is included as a component of the original server motherboard, then the server motherboard typically will not support expanders, but rather, will support a fixed number of ports. In that case, the maximum possible port number value is equal to whatever the total number of ports is that is supported by the system. The number of ports that are supported is typically contained in a storage register located in a memory device of the motherboard. Therefore, the program 50 will simply cause the CPU 30 or other processing logic to check this register to ascertain the number of supported ports and whether one of the ports is not connected to an actual PD.

For example, if the system supports a maximum of eight ports numbered port #0-port #7 and there are a total of six PDs numbered PD0, PD1, PD2, PD3, PD4 and PD5 connected to port #s 0, 2, 3, 4, 5, and 7, respectively, the server CPU will determine that port #1 is a port that is not connected to an actual PD. At this point in the process, the port number value will have been incremented once (i.e., from 0 to 1), and the process will then proceed to block 107, as will be described below in more detail. Therefore, port #6 is never checked. However, if there are eight PDs occupying all eight ports, the process would end after port #7 has been checked, at which point the current port number value would have been incremented eight times (i.e., from 0 to 7).

If the I/O interface device 100 (FIG. 2) is not a component provided on the original server motherboard, but rather, is an add-in component (i.e., a PCI-based device that plugs into a PCI slot of the server motherboard), the portion of the process represented by blocks 103 ands 105 is slightly different than that described above due to the fact that the add-in I/O interface device 100 preferably is configured to support the use of one or more expanders. When expanders are used, the maximum number of ports that are available for connection with PDs is typically much larger. Each expander connects to one of the ports and has multiple slots, which essentially correspond to additional ports. For example, if the I/O interface device 100 is a four-port device, the user can either connect four PDs directly to the I/O interface device 100 or can connect two expanders, each having four bays, to two of the ports of the I/O interface device 100. If the I/O interface device 100 is, for example, an eight-port device, the user can either connect eight PDs directly to the I/O interface device 100 or connect an eight-bay expander to a single port of the device 100. In the case where expanders are used, the total number of ports that are supported will depend on the type and number of expanders that are used.

In a scenario in which expanders are used and the I/O interface device 100 is an add-in component, the maximum port number value may be, for example, 122. At some point in time prior to performing the portions of the process represented by blocks 103 and 105, and typically prior to the start of the process shown in FIG. 3, the CPU 30 or other processing logic queries the I/O interface device 100 for the maximum port number value. When the I/O interface device 100 returns the maximum port number value, the CPU 30 or other processing logic causes this value to be stored in a memory register (e.g., a location in memory device 40 or in Option ROM device 110). Subsequently, the portions of the process represented by blocks 103 and 105 are performed in the manner described above using the stored maximum port number value. That is, the ports are checked to determine whether one of the ports is not connected to an actual PD while the port number value is incremented until either (1) a port is found that is not occupied by an actual PD or (2) the port number value has been incremented up to a maximum value of 122.

If a port is found that is not occupied by an actual PD, then the logical PD associated with the physically missing PD is remapped to the unoccupied port, as indicated by block 107. As indicated above, this remapping of the logical PD is typically then recorded in a memory device, such as in the Option ROM device 110 and/or in the server memory device 40. Storing the remapping information for the logical PD updates the corresponding configuration of the VD to which the missing PD belongs. As indicated above, after the remapping has been performed, preferably a message is displayed to the user on the display device 70 (FIG. 2) that gives the user the choice of either accepting the new configuration as resolved by the program 50 or shutting down the system 20 and placing the PDs 27 back in the original slots. This step is represented by block 109 in FIG. 3. For example, the following message may be displayed:

"PD(s) reassigned to different slot(s) because originally configured slot(s) have different PD(s). If you believe this is not a desired behavior, please power off the system and return the PD(s) to their original slots to restore the previous configuration. Otherwise, press any key to accept the resolved configuration."

If a determination is made at block 105 that a port that is not already connected to an actual PD cannot be found, then preferably a message is displayed on the display device 70 that informs the user that the logical PD associated with the missing actual PD cannot be reassigned to another port, as indicated by block 106. For example, this message may read as follows:

"Missing Drive cannot be relocated. If you believe this is not a desired behavior, please power off the system and return the PD(s) to their original slots to restore the previous configuration."

Many modifications may be made to the method described above with reference to FIG. 3. For example, the method may include additional steps that are not depicted in FIG. 3. As an example, prior to the step represented by block 107 being performed, a message may be displayed to the user prompting the user to authorize the remapping of the logical PD. In this case, if the user does not authorize the remapping, the process may exit, and/or cause a message to be displayed that indicates that the configuration conflict has not been resolved. The method may also include an additional step of automatically updating the DDF of the missing PD after it has been connected to the unoccupied port. Also, if multiple configuration conflicts have been detected at the step represented by block 101, the entire process may be repeated for each conflict until all of the conflicts have been resolved. Those of ordinary skill in the art will understand the manner in which these and other modifications may be made.

It should be noted that although the illustrative embodiment described above with reference to FIGS. 2 and 3 refers to the conflict resolution program 50 being executed in the CPU 30, a processor (not shown) other than the CPU 30 may be used for this purpose. The conflict resolution program 50 is computer code that resides on some computer-readable medium and is capable of being executed by some type of processing logic. This processing logic could be the CPU 30 or it could be some other processor (not shown) that is in communication with the I/O interface device 100 or part of the I/O interface device 100. Also, the tasks described above with reference to FIG. 3 may be performed by a single processor or distributed across multiple processors. The term "processor" as that is used herein, is intended to denote a single processor or multiple processors, and may or may not be the CPU 30. For example, when the server motherboard is manufactured and assembled, it may be equipped with one or more processors other than the CPU. One or more of these other processors may execute the Option ROM code 50. The processor used for this purpose may be, but is not limited to, a microprocessor, a microcontroller, an application specific integrated circuit (ASIC), a field programmable gate array (FPGA), a programmable logic array (PGA), or a combination of two or more of these devices.

It should be noted that the invention has been described with reference to a few illustrative or exemplary embodiments and that the invention is not limited to the embodiments described herein. Persons of ordinary skill in the art will understand the manner in which modifications may be made to the embodiments described herein without deviating from the principles and concepts of the invention, and that all such modifications are within the scope of the invention.

What is claimed is:

1. A software-based Redundant Array of Inexpensive Disks (RAID) system comprising:
    an input/output (I/O) interface device having a plurality of ports, each of the ports having a respective port number;
    at least one actual physical disk (PD) connected to at least one of the ports of the I/O interface device;
    a memory device; and
    a processor, the processor being configured to perform a conflict configuration resolution algorithm that detects an existence of a conflict in a current configuration of the RAID system and resolves a detected configuration conflict, the processor detecting an existence of a configuration conflict by determining whether or not a current RAID system configuration indicates that a first logical disk and a second logical disk are mapped to a same port number of the I/O interface device, the first and second logical disks being logical representations of first and second actual PDs, respectively, wherein the first and second logical disks are associated with first and second virtual disk (VD) configurations, respectively, and wherein the processor determines whether or not the current RAID system configuration indicates that the first and second logical disks are mapped to the same port number by:
    sending a command from the processor to the ports of the I/O interface device that causes any actual PDs connected to the ports to return data associated with the respective actual PD to the processor;
    processing the returned data in the processor to compute PD_References associated with the returned data; and
    in the processor, comparing the PD_References associated the returned data with respective logical PD_References contained in the first and second VDs configurations of the RAID system to determine whether or not the PD_References associated with the returned data and the respective logical PD_References match, wherein if the processor determines that at least one of the PD_References associated with the returned data does not match the respective logical PD_Reference, the processor decides that a configuration conflict exists, wherein if the processor determines that the first and second logical disks are mapped to the same port number of the I/O interface device, the processor resolves the configuration conflict by maintaining the mapping of the first logical disk to said same port number and remapping the second local disk to a different port of the I/O interface device that is not currently connected to an actual PD, wherein the remapping results in the configuration of the RAID system being changed from said current configuration to a new configuration.

2. The software-based RAID system of claim 1, wherein the processor is the central processing unit (CPU) of a server of the RAID system, and wherein the algorithm is implemented as a computer software program that is executed by the CPU.

3. The software-based RAID system of claim 1, wherein the conflict resolution algorithm is implemented as computer software code that is part of BIOS POST computer software code, and wherein the conflict resolution code is executed by the processor during execution of the BIOS POST code by the processor.

4. The software-based RAID system of claim 1, wherein if the processor decides that a configuration conflict exists, the configuration conflict is resolved by:
   checking one or more of the ports of the VO interface device to find a port that is not connected to an actual PD;
   if a port is found that is not connected to an actual PD, identifying the unconnected port as an unoccupied port; and
   remapping the second logical disk to the port number of the unoccupied port.

5. The software-based RAID system of claim 4, wherein resolving a configuration conflict further comprises:
   displaying a message on a display device that advises a user of the system that the remapping has been performed and to either indicate acceptance of the remapping or shut down the RAID system and restore said previous configuration of the RAID system.

6. The software-based RAID system of claim 4, wherein resolving a detected configuration conflict further comprises:
   if a port that is not connected to an actual PD is not found, displaying a message on a display device that advises the user that a remapping of a logical disk cannot be performed.

7. A method for detecting and resolving configuration conflicts in a software-based Redundant Array of Inexpensive Disks (RAID) system comprising:
   in a processor of the software-based RAID system, detecting if a configuration conflict exists in the RAID system by determining whether or not a current configuration of the RAID system indicates that a first logical disk and a second logical disk are mapped to a same port number of an input/output (I/O) interface device of the RAID system, the first and second logical disks being logical representations of first and second actual PDs, respectively, wherein the first and second logical disks are associated with first and second virtual disks (VDs), respectively, and wherein the determination of whether or not the first and second logical PDs are mapped to the same port number comprises:
   sending commands from the processor to ports of the I/O interface device that instruct one or more actual PDs connected to respective ports of the I/O interface device to return respective data associated with the respective actual PDs to the processor;
   receiving the respective returned data in the processor and processing the respective returned data to compute respective PD_References, each respective PD_Reference uniquely identifying the respective actual PD that returned the respective data to the processor; and
   in the processor, comparing each respective PD_Reference associated with the respective returned data with a respective logical PD_Reference to determine whether or not the respective PD_Reference associated with the respective returned data matches the respective logical PD_Reference, wherein if the CPU determines that the PD_Reference associated with the respective returned data does not match the respective logical PD_Reference, the processor decides that a configuration conflict exists in the RAID system; and
   if the processor determines that the first and second logical disks are mapped to the same port number of the I/O device, performing a conflict resolution algorithm that resolves the configuration conflict by maintaining the mapping of the first logical disk to said same port number and remapping the second logical disk to a port of the I/O interface device that is not currently connected to an actual PD.

8. The method of claim 7, wherein the conflict resolution algorithm is implemented as computer software code that is part of BIOS POST computer software code, and wherein the conflict resolution code is executed by the processor during execution of the BIOS POST code by the processor.

9. The method of claim 7, wherein the processor is the central processing unit (CPU) of the RAID system, and wherein the method is implemented as a computer software program that is executed by the CPU.

10. The method of claim 7, wherein the conflict resolution algorithm comprises:
    checking one or more of the ports of the I/O interface device to find a port that is not connected to an actual PD;
    if a port is found that is not connected to an actual PD, identifying the unconnected port as an unoccupied port; and
    remapping the second logical disks to the port number of the unoccupied port.

11. The method of claim 10, wherein the conflict resolution algorithm further comprises:
    displaying a message on a display device that advises a user of the system that the remapping has been performed and prompts the user to either indicate acceptance of the remapping or shut down the RAID system and restore said previous configuration of the RAID system.

12. The method of claim 11, wherein the conflict resolution algorithm further comprises:
    if a port that is not connected to an actual PD is not found, displaying a message on a display device that advises the user that a remapping of a logical disk cannot be performed.

13. A computer-readable medium having a computer software program stored thereon for detecting and resolving configuration conflicts in a software-based Redundant Array of Inexpensive Disks (RAID) system, the computer software program comprising computer instructions for execution by a processor, the program comprising:
    code for determining whether or not a current RAID system configuration indicates that a first logical disk and a second logical disk are mapped to a same port number of an input/output (I/O) interface device of the RAID system, the first and second logical disks being logical representations of first and second actual PDs, respectively, the code comprising:

code for causing commands to be sent to ports of the I/O interface device that instruct one or more actual PDs connected to respective ports of the I/O interface device to return respective data associated with the respective actual PDs to the processor;

code for processing the respective returned data to compute respective PD_References uniquely identifying a respective actual PD;

code for comparing each respective PD_Reference associated with the respective returned data with a respective logical PD_Reference to determine whether or not the respective PD_Reference associated with the respective returned data matches the respective logical PD_Reference, wherein if a determination is made that the PD_Reference associated with the respective returned data does not match the respective logical PD_Reference, the processor decides that a configuration conflict exists in the RAID system; and code for resolving a configuration conflict by maintaining the mapping of the first logical disk to said same port number and remapping the second logical disk to a port of the I/O interface device that is not currently connected to an actual PD.

14. The computer-readable medium of claim 13, wherein the code for resolving a configuration conflict includes:

code for checking one or more of the ports of the I/O interface device to find a port that is not connected to an actual PD;

code for identifying a port found not to be connected to an actual PD as an unoccupied port; and code for remapping the second logical disk to die port number of the unoccupied port.

15. The computer-readable medium of claim 14, wherein the code for resolving a configuration conflict further includes:

code for causing a message to be displayed on a display device that advises a user of the system that the remapping has been performed and prompts the user to either indicate acceptance of the remapping or shut down the RAID system and restore said previous configuration of the RAID system.

16. The computer-readable medium of claim 14, wherein the code for resolving a configuration conflict further includes:

code for causing a message to be displayed on a display device that advises a user that a remapping of a logical disk cannot be performed in an event that a port that is not connected to an actual PD cannot be found.

* * * * *